(12) United States Patent
Kim

(10) Patent No.: US 10,835,998 B2
(45) Date of Patent: Nov. 17, 2020

(54) WELDING WIRE FOR HIGH-STRENGTH STEEL

(71) Applicants: HYUNDAI MOTOR COMPANY, Seoul (KR); KIA Motors Corporation, Seoul (KR)

(72) Inventor: Doo Young Kim, Daejeon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 327 days.

(21) Appl. No.: 15/841,702

(22) Filed: Dec. 14, 2017

(65) Prior Publication Data

US 2019/0126410 A1  May 2, 2019

(30) Foreign Application Priority Data

Oct. 30, 2017  (KR) ................. 10-2017-0142091

(51) Int. Cl.
| | |
|---|---|
| B23K 35/30 | (2006.01) |
| B23K 35/02 | (2006.01) |
| C22C 38/02 | (2006.01) |
| C22C 38/06 | (2006.01) |
| C22C 38/04 | (2006.01) |
| C22C 38/60 | (2006.01) |
| B23K 35/36 | (2006.01) |

(52) U.S. Cl.
CPC ...... *B23K 35/3093* (2013.01); *B23K 35/0261* (2013.01); *C22C 38/02* (2013.01); *C22C 38/04* (2013.01); *C22C 38/06* (2013.01); *C22C 38/60* (2013.01); *B23K 35/3602* (2013.01)

(58) Field of Classification Search
CPC ................ B23K 35/3093; B23K 0261

USPC ........................ 219/146.1, 138–480
See application file for complete search history.

(56) References Cited

U.S. PATENT DOCUMENTS

| | | | |
|---|---|---|---|
| 3,944,776 A | 3/1976 | Tsuboi et al. | |
| 5,120,931 A * | 6/1992 | Kotecki | B23K 35/308 |
| | | | 219/146.22 |
| 6,339,209 B1 * | 1/2002 | Kotecki | B23K 35/3601 |
| | | | 148/24 |
| 7,491,910 B2 * | 2/2009 | Kapoor | B23K 35/0261 |
| | | | 219/145.1 |
| 7,906,747 B2 * | 3/2011 | Poulalion | C21C 7/0056 |
| | | | 219/145.22 |
| 9,764,429 B2 * | 9/2017 | Chen | B23K 35/0266 |
| 10,406,637 B2 * | 9/2019 | Yan | B23K 35/362 |
| 2004/0173592 A1 * | 9/2004 | Duncan | B23K 9/04 |
| | | | 219/137 WM |
| 2006/0186103 A1 * | 8/2006 | Rajan | B23K 35/0266 |
| | | | 219/145.22 |

* cited by examiner

FOREIGN PATENT DOCUMENTS

| | | |
|---|---|---|
| JP | 2006-021224 A | 1/2006 |
| KR | 10-2016-0139686 A | 12/2016 |

*Primary Examiner* — Lori L Baker
(74) *Attorney, Agent, or Firm* — McDonnell Boehnen Hulbert & Berghoff LLP

(57) ABSTRACT

A welding wire for high-strength steel for improving slag coagulation includes a combination of Carbon, Manganese, Silicon, Aluminum, Sulfur, and Selenium. With use of the welding wire, the generation of slag is minimized, and the slag is allowed to induce the generation of crystalline oxides having a low surface energy, so that the slag is easily removed, and the flow of a molten pool to the center in a width direction of a weld bead do that the slag is coagulated.

5 Claims, 5 Drawing Sheets

| | Slag distribution | Image of molten pool | Schematic diagram of molten pool convection |
|---|---|---|---|
| Comparative example |  |  |  |
| Example 1 |  |  |  |
| Example 2 |  |  |  |

WELDING WIRE FOR HIGH-STRENGTH STEEL

CROSS-REFERENCE TO RELATED APPLICATION

This application claims the priority benefit of Korean Patent Application No. 10-2017-0142091, filed on Oct. 30, 2017, in the Korean Intellectual Property Office, the disclosure of which is incorporated herein by reference.

BACKGROUND OF THE DISCLOSURE

1. Field of the Disclosure

The present disclosure relates to a welding wire used in for welding of high-strength steel and, more specifically, to a welding wire for high-strength steel, the welding wire being capable of minimizing the generation of slag in the welding of high-strength steel and improving physical properties and paintability of a welded portion.

2. Description of the Prior Art

As ships, buildings, bridges, offshore structures and similar structures have recently become larger, the use of high-strength steel has gradually increased. As a result, welding is inevitable in the manufacture of such structures using the high-strength steel.

In particular, there is a need for the manufacture of structures that secure stability in extreme environments since the development in extreme environment regions, such as deep sea or polar areas, has gradually progressed.

Therefore, there is a need for securing welded portions in large-sized structures or special structures, such as structures used in extreme environments, to have excellent physical properties in order to secure stability.

Conventionally, arc welding using a welding wire was mainly employed for welding high-strength steel. However, electrodeposition painting on a welded portion was challenging due to the slag generated during welding, which is problematic.

FIG. 1 is a diagram illustrating slag remaining between a weld bead and a base material after conventional welding.

As shown in FIG. 1, when welding a pair of base materials 1 using welding wire 10, slag 30 remains in a toe portion between a weld bead 20 and a base material 1. The residual slag 30 causes the peeling of electrodeposition painting or the deterioration of anti-corrosive performance of the base material 1.

Moreover, the slag 30 remaining in the toe portion is not easy to remove, causing the deterioration of stability of structures.

The foregoing is intended merely to aid in the understanding of the background of the present disclosure, and is not intended to mean that the present disclosure falls within the purview of the related art that is already known to those skilled in the art.

SUMMARY OF THE DISCLOSURE

The present disclosure has been made to solve the above-mentioned problems occurring in the prior art by providing a welding wire for high-strength steel, the welding wire being capable of minimizing the generation of slag and facilitating coagulation and removal of the generated slag.

Another aspect of the present disclosure is to provide a welding wire for high-strength steel, the welding wire being capable of suppressing the remaining of slag between a weld bead and a base material, thus improving paintability and anti-corrosive performance of a welded portion.

In order to accomplish the above, there is provided a welding wire for high-strength steel, the welding wire containing, in terms of weight percent (wt %) relative to the total weight thereof, about 0.09-0.11% C, about 0.2-0.4% Mn, about 0.3-0.65% Si, about 0.03-0.04% Al, about 0.05-0.07% S, about 0.005-0.01% Se, and Fe and other impurities comprising the balance.

The weight ratio of Mn:Al:Si may be 3:2:3.

Here, an Al—Mn—Si-based crystalline oxide may be generated from slag resulting from a welding process.

The Al—Mn—Si-based crystalline oxide may be $Mn_3Al_2Si_3O_{12}$.

Here, the welding wire is capable of forming a molten pool during a welding process, the pool is capable of flowing to a center portion in a width direction of a weld bead, thereby allowing a generated slag to be concentrated on the center portion.

According to an embodiment of the present disclosure, the generation of slag is minimized at the time of welding and the generated slag is coagulated. This facilitates the removal of the generated slag, improves the physical properties of a welded portion, and facilitates the painting of the welded portion.

In addition, the remaining of slag in a toe portion is prevented, thereby improving mechanical properties and anti-corrosive performance of a welded portion.

BRIEF DESCRIPTION OF THE DRAWINGS

The above and other objects, features, and advantages of the present disclosure will be more apparent from the following detailed description taken in conjunction with the accompanying drawings, in which.

DETAILED DESCRIPTION OF THE PREFERRED EMBODIMENTS

Hereinafter, preferred embodiments of the present disclosure will be described in detail with reference to the accompanying drawings. However, the present disclosure is not restricted or limited to the embodiments. For reference, like numerals substantially refer to like elements throughout the present specification, and can be described with reference to contents described in other drawings in the following description, and the contents that are determined to be apparent to those skilled in the art or that are repeated may be omitted.

The welding wire for high-strength steel according to an embodiment of the present disclosure is characterized in that, while the generation of slag is minimized, the slag is allowed to induce the generation of crystalline oxides having a low surface energy so that the slag is easily removed, and the flow of a molten pool to the center in a width direction of a weld bead so that the slag is coagulated.

Figure 1:
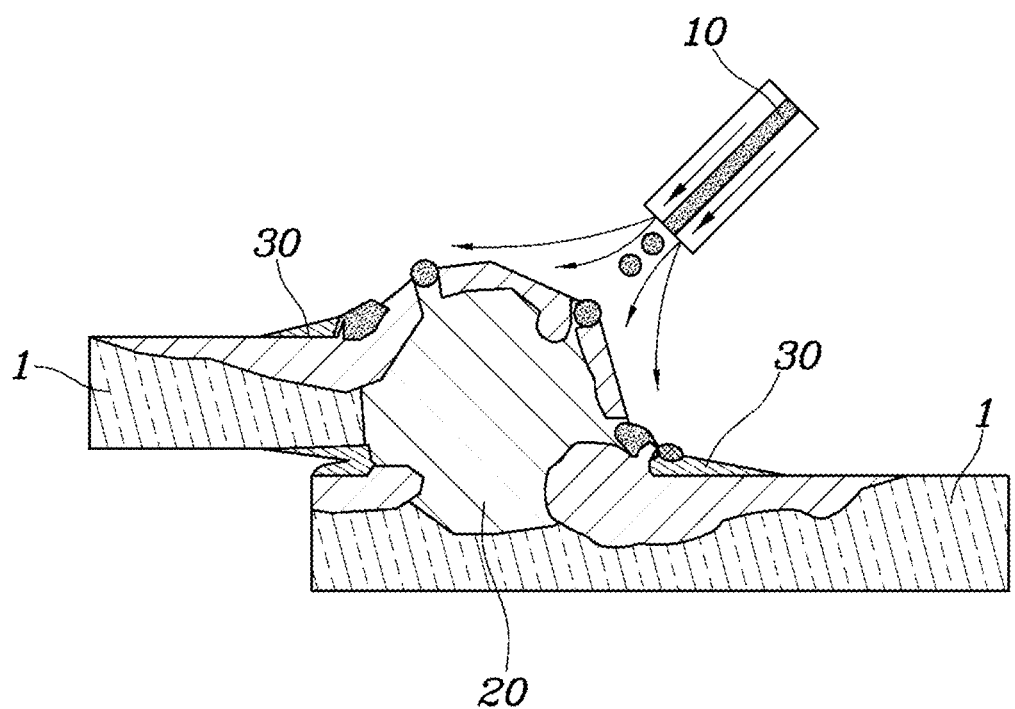
FIG. 1 is a diagram illustrating slag remaining between a weld bead and a base material after welding.
Figure 2:
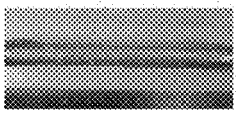
FIG. 2 provides diagrams comparing arc welding using a conventional welding wire and arc welding using a welding wire for high-strength steel according to various examples of the present disclosure.
Figure 2:
Figure 2:
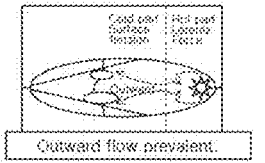
Figure 2:
Figure 2:
Figure 2:
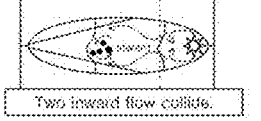
Figure 2:
Figure 2:
Figure 2:
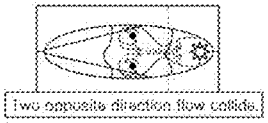
Figure 3:
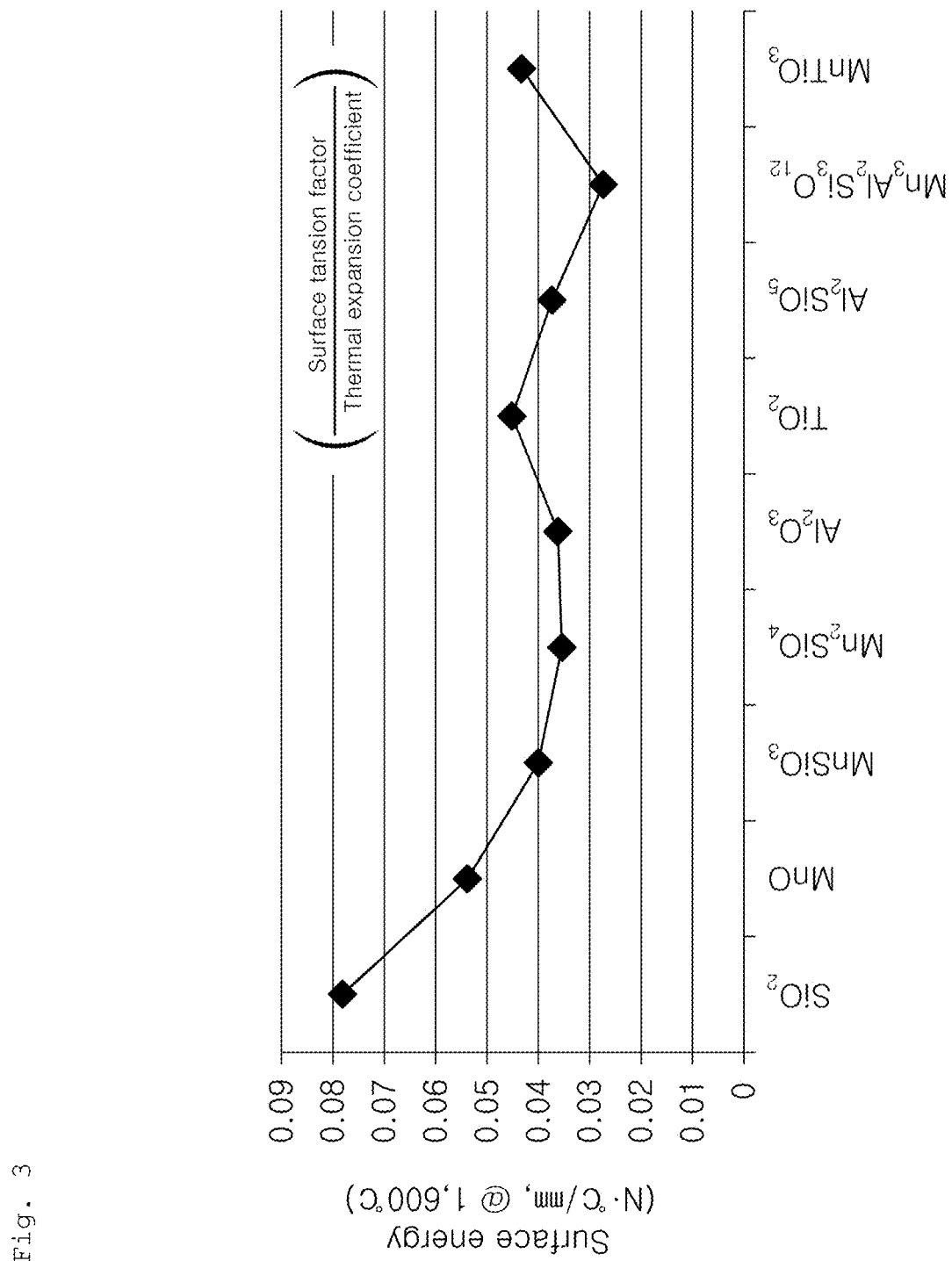
FIG. 3 is a graph comparing surface energy among various crystalline oxides.

FIG. 2 provides diagrams comparing arc welding using a conventional general welding wire and arc welding using a welding wire for high-strength steel according to various examples of the present disclosure. FIG. 3 is a graph comparing surface energy among various crystalline oxides.

As shown in FIGS. 2 and 3, in the conventional art, it was advantageous to minimize the contents of manganese (Mn) and silicon (Si) in order to minimize slag, but this led to a deterioration of strength and viscosity of a welded portion. However, when manganese (Mn) and silicon (Si) are limited to the ranges according to the examples of the present disclosure, the generation of slag can be minimized. Further, the flow of a molten pool is induced to the center in a width direction of the weld bead using Marangoni convection. Thus, when the slag coagulated on the center of the weld bead, it can be easily removed using a brush or a similar device.

Hereinafter, the composition of the present disclosure will be described in detail. The contents of respective components were expressed by weight percent (wt %) relative to the total weight of the welding wire.

The content of carbon (C) is preferably 0.09-0.11%.

Carbon (C) is an essential component for securing the strength and welding curability of a welded portion. The addition of less than 0.09% of carbon (C) makes it difficult to secure physical properties of the welded portion. The addition of more than 0.11% of carbon (C) causes significant deterioration of weldability and remarkably reduces impact toughness. Therefore, the content of carbon (C) is preferably delimited within the above range.

The content of manganese (Mn) is preferably 0.2-0.40.

Manganese (Mn) is an element that is effective in the improvement of a deacidification action and strength and improves a molten pool flow changing effect. If the content of manganese (Mn) is more than 0.4%, the molten pool flow changing effect is slight, which leads to inhibiting the remaining of slag between a base material and a weld bead, that is, on a toe portion. If the content of manganese (Mn) is less than 0.2%, crystalline oxides having a low surface energy are not smoothly generated, and thus the removal of slag becomes difficult. Therefore, the content of manganese (Mn) is delimited within the above range.

The content of silicon (Si) is preferably 0.3-0.65%.

Silicon (Si), together with manganese (Mn), is an element that generates crystalline oxides having low surface energy. As the content of silicon (Si) is lower, the viscosity of the molten pool decreases, and thus the molten pool flow changing effect is improved. More than 0.65% of silicon (S) increases the viscosity of a molten pool, thus reducing the molten pool flow changing effect. Therefore, the content of manganese (Mn) is delimited within the above range.

The content of aluminum (Al) is preferably 0.03-0.04%.

Aluminum (Al), together with manganese (Mn) and silicon (Si), is an element that generates Al—Mn—Si-based crystalline oxides having relatively low surface energy. If the content of aluminum (Al) is less than 0.03%, $Mn_3Al_2Si_3O_{12}$ having the lowest surface energy, as shown in FIG. 3, is not smoothly generated, and thus, a desired effect is difficult to attain. If the content of aluminum (Al) is more than 0.04%, the generated crystalline oxides have a low coefficient of thermal expansion, and thus the removal of slag is difficult. Therefore, the content of aluminum (Al) is delimited within the above range.

Here, the welding wire for high-strength steel according to an embodiment of the present disclosure is preferable when the weight ratio of manganese (Mn), aluminum (Al), and silicon (Si) is 3:2:3. With this weight ratio, slag is used to maximize the generation of $Mn_3Al_2Si_3O_{12}$ among Al—Mn—Si-based crystalline oxides, and thereafter, the removal of slag can be easily conducted.

The content of selenium (Se) is preferably 0.005-0.01%.

Selenium (Se) is one of surface activation elements that reduces the surface energy of a molten pool and improves slag coagulation by changing the Gibbs free energy per particle, that is, chemical potential. If the content of selenium (Se) is less than 0.005%, the surface energy reducing effect of the molten pool is slight, causing surface tearing. If the content of selenium (Se) is more than 0.01%, the coagulated slag is stuck together, and thus the effects of the slag are difficult to exert and painting adhesion is degraded.

The content of sulfur (S) is preferably 0.05-0.07%.

If the content of sulfur (S) is more than 0.07%, an intermediate such as FeS is generated, causing the deterioration of physical properties, such as mechanical strength, of a welded portion. If the content of sulfur (S) is less than 0.05%, the surface tension changing effect of a molten pool is slight. Therefore, the content of sulfur (S) is delimited within the above range.

TABLE 1

| Classification | C | Mn | Si | Al | Se | S | Fe | Presence of slag in toe portion | Slag evauation |
|---|---|---|---|---|---|---|---|---|---|
| Example 1 | 0.1 | 0.39 | 0.55 | 0.035 | 0.0088 | 0.05 | rem. | x | pass |
| Example 2 | 0.1 | 0.33 | 0.53 | 0.036 | 0.0075 | 0.05 | rem. | x | pass |
| Comparative Example 1 | 0.88 | 0.35 | 0.48 | 0.033 | 0.0077 | 0.05 | rem. | o | fail |
| Comparative Example 2 | 0.115 | 0.30 | 0.57 | 0.034 | 0.0080 | 0.05 | rem. | o | fail |
| Comparative Example 3 | 0.1 | 0.15 | 0.5 | 0.035 | 0.0075 | 0.05 | rem. | o | fail |
| Comparative Example 4 | 0.1 | 0.45 | 0.5 | 0.035 | 0.0075 | 0.05 | rem. | o | fail |
| Comparative Example 5 | 0.1 | 0.3 | 0.35 | 0.035 | 0.0075 | 0.05 | rem. | o | fail |
| Comparative Example 6 | 0.1 | 0.3 | 0.7 | 0.035 | 0.0075 | 0.05 | rem. | o | fail |
| Comparative Example 7 | 0.1 | 0.3 | 0.5 | 0.025 | 0.0075 | 0.05 | rem. | o | fail |

TABLE 1-continued

| Classification | C | Mn | Si | Al | Se | S | Fe | Presence of slag in toe portion | Slag evauation |
|---|---|---|---|---|---|---|---|---|---|
| Comparative Example 8 | 0.1 | 0.3 | 0.5 | 0.045 | 0.0075 | 0.05 | rem. | o | fail |
| Comparative Example 9 | 0.1 | 0.3 | 0.5 | 0.035 | 0.0045 | 0.05 | rem. | o | fail |
| Comparative Example 10 | 0.1 | 0.3 | 0.5 | 0.035 | 0.0105 | 0.05 | rem. | o | fail |

Figure 4:
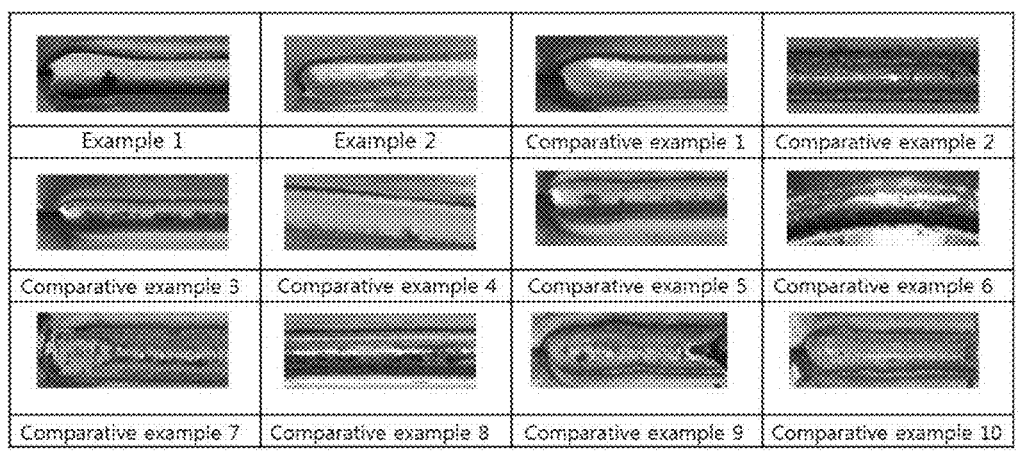
FIG. 4 provides images showing the formation of weld bands at the time of welding in various examples and comparative examples in table 1.

Table 1 above shows the presence of slag in a toe portion and slag evaluation results in various examples and comparative examples according to an embodiment of the present disclosure. FIG. 4 provides images showing the formation of weld bands at the time of welding in various examples and comparative examples in Table 1.

As can be seen from Table 1 and FIG. 4, when the composition range of the present disclosure is satisfied, the surface energy of slag was low, and thus the slag was easily removed and the slag did not remain in the toe portion. In the comparative examples, the slag remained in the toe portion to form slag bands. Further, comparative examples 4 to 10, excluding comparative examples 1 and 2, did not satisfy the reference values of the present disclosure since the surface energy of slag was high.

Figure 5:
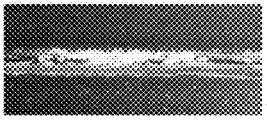
FIG. 5 is a diagram comparing paintability according to the selenium (Se) content.

FIG. 5 provides images showing an external appearance of a welded portion after the welded portion was painted and the painting adhesion evaluation results in example 1 and comparative examples 9 and 10.

The painting adhesion evaluation was conducted in the following manner: an adhesive tape, such as a cellophane adhesive tape, was attached to the painted welded portion; the same force was then applied thereto at an angle of 45° to remove the adhesive tape; and thereafter, the area of the paint on the adhesive tape was measured.

As shown in FIG. 5, in comparative example 10 in which the content of selenium (Se) was more than 0.01 wt %, the amount of slag was excessively increased to form a new layer composed of silicone (Si) and aluminum (Al) compounds and had a negative influence on painting adhesion, resulting in significant deterioration of painting adhesion. In case that the content of selenium (Se) was less than 0.005 wt %, the amount of slag was too slight to form a new layer. However, as shown in comparative example 9, in case that the content of selenium (Se) was less than 0.005 wt %, the amount of slag causes interlayer separation between welding bead and Fe oxide layer.

Thus, it can be seen that the paintability was improved when the content of selenium (Se) was in the range of 0.005-0.01 wt %.

As described above, when arc welding is conducted using a welding wire according to an embodiment of the present disclosure, the surface energy of the slag is lowered. Thus, the amount of slag remaining in the toe portion is reduced by about 80%, as compared with a welded portion formed using arc welding using a general welding wire in the conventional art. As a result, a slag band with a band shape is not formed, thereby improving paintability of the welded portion and anti-corrosive performance of the toe portion and, further, increasing the lifetime of the manufactured products.

Although the preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A welding wire for high-strength steel for improving slag coagulation, the welding wire essentially consisting of: in terms of weight percent relative to the total weight thereof, 0.09-0.11% C, 0.2-0.4% Mn, 0.3-0.65% Si, 0.03-0.04% Al, 0.05-0.07% S, 0.005-0.01% Se, and a remainder composed of Fe and impurities whereas such effects of narrowing ranges of a combination of elements improves slag coagulation.

2. The welding wire of claim 1, wherein the weight ratio of Mn:Al:Si is 3:2:3.

3. The welding wire of claim 1, wherein an Al—Mn—Si-based crystalline oxide is generated as slag resulting from a welding process.

4. The welding wire of claim 3, wherein the Al—Mn—Si-based crystalline oxide is Mn3Al2Si3O12.

5. The welding wire of claim 1, further forms a molten pool during a welding process, the pool flowing to a center portion in a width direction of a weld bead, thereby allowing a generated slag to be concentrated on the center portion.

* * * * *